F. S. ELLETT.
COASTER BRAKE FOR MOTOR CYCLES.
APPLICATION FILED JUNE 26, 1912.

1,154,915.

Patented Sept. 28, 1915.

Witnesses
F. C. Gibson.
B. M. Kent.

Inventor
F. S. Ellett
by Foster Freeman Watson & Coit
Attorneys

UNITED STATES PATENT OFFICE.

FREDERICK S. ELLETT, OF ELMIRA, NEW YORK.

COASTER-BRAKE FOR MOTOR-CYCLES.

1,154,915.  Specification of Letters Patent.  Patented Sept. 28, 1915.

Application filed June 26, 1912. Serial No. 706,110.

*To all whom it may concern:*

Be it known that I, FREDERICK S. ELLETT, a citizen of the United States, residing at Elmira, county of Chemung, and State of New York, have invented certain new and useful Improvements in Coaster-Brakes for Motor-Cycles, of which the following is a specification.

This invention relates to coaster brakes and more particularly to coaster brakes for use on motor cycles.

One of the objects of the invention is to provide a coaster brake having a large retarding surface whereby the action of the brake is effected with a moderate amount of applied force and the wear on the rubbing surfaces of the brake is greatly reduced.

Another object of the invention is to provide a brake of this character which may be assembled or disassembled without disturbing the adjustment of the bearings for the wheel.

Figure 1:
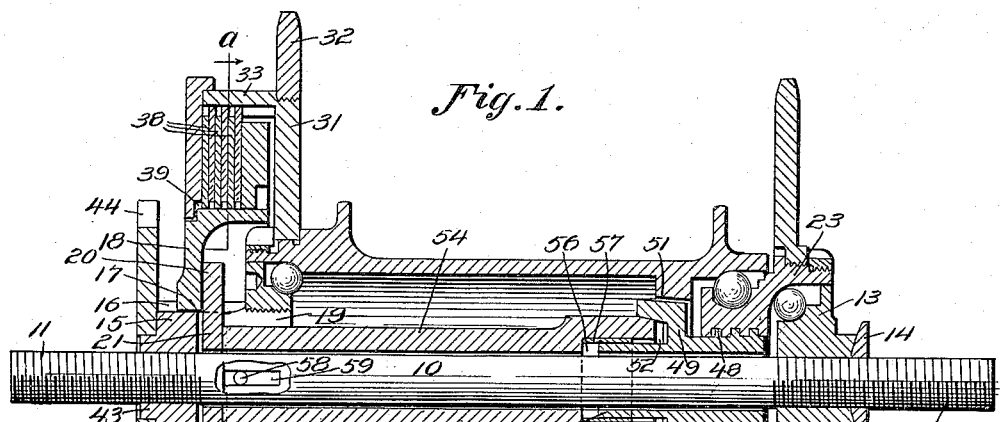
Figure 2:
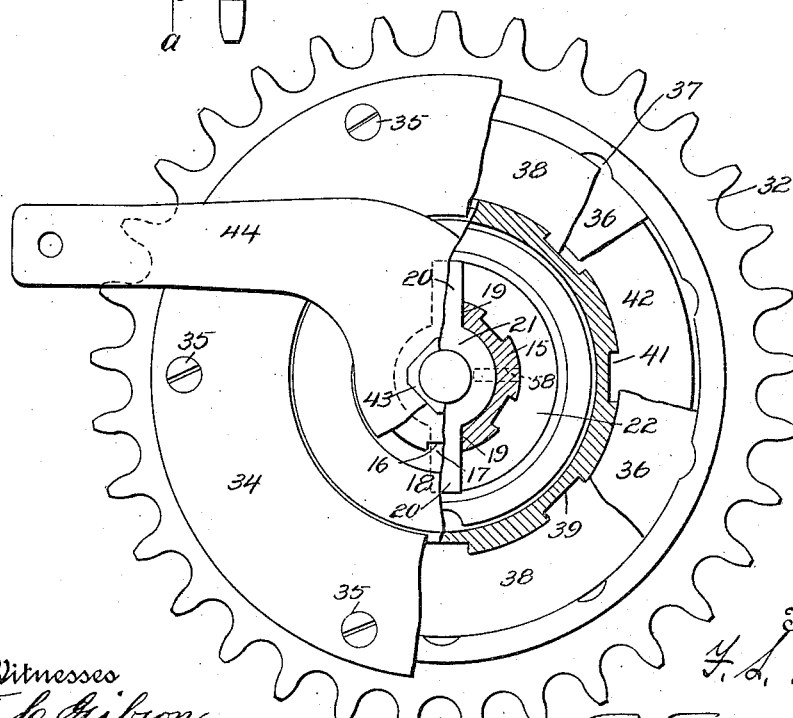

Other objects and the features of novelty of the invention will be apparent from the following description taken in connection with the accompanying drawings in which:

Figure 1 is a longitudinal section through the brake; Fig. 2 is a composite view, one-half of which is an elevation of the left hand end of Fig. 1 and the other half of which is a section on the line *a—a* of Fig. 1, with certain parts broken away.

Referring to the drawings, 10 indicates a wheel axle having threaded end portions 11 and 12. A bearing cone 13 is arranged on the threaded portion 12 of the axle and may be held in position by means of the lock nut 14. A member 15 is arranged on the threaded portion 11 of the axle and is provided with the axially extending grooves 16 which are engaged by projections 17 on the disk or member 18. The member 15 is also provided at its inner end with the transversely extending slot 19 in which are arranged the outwardly projecting arms 20 carried by a ring 21 which surrounds the axle 10. The inner end of the member 15 is screw threaded and has arranged thereon the bearing cone 22. A driving member 23 is rotatably mounted on the bearing cone 13 by means of the balls 24. On the exterior of the inner end of the driving member 23 is a ball race 25 in which are arranged the balls 26.

The hub 27 of the wheel is rotatably mounted on the balls 26 and the balls 28 which run on the cone 22. The hub 27 is provided with the usual spoke flanges 29 and 30 and has also arranged on one end thereof a wheel 31 which may carry the sprocket ring 32. The wheel 31 is provided with an outwardly projecting flange 33 to which is secured a plate 34 by means of suitable screws 35. From Fig. 1 it will be seen that the wheel 31, flange 33 and plate 34 form an annular chamber in which may be conveniently arranged a series of friction disks. The disks 36 may be provided with outwardly projecting teeth or lugs which engage suitable recesses 37 in the flange 33 and the disks 38 which are alternately arranged with the disks 36 may be provided with inwardly projecting teeth or lugs which engage suitable grooves 39 in the member 18. The member 18 may also be provided with an outwardly extending flange 40 which forms an abutment for the flange 41 on a ring 42 and holds the ring on the end of said member. The flange 41 may be provided with inwardly projecting teeth or lugs 41' similar to those on disks 38 for the purpose of preventing the ring 42 from rotating on the member 18.

The member 15 may be provided at its outer end with a reduced rectangular hub 43 which receives an arm 44, this arm having its outer end fixed to the frame or any other suitable part of the motor cycle. By this construction the members 15 and 18 and the ring 42 and the disks 38 will be securely held against rotation. It will also be observed by removing the arm 44 and the end plate 34, the member 18, the disks 36 and 38 and the ring 40 may be readily removed without disturbing the bearings or other parts of the hub.

The driving member 23 carries a suitable driving wheel 45 which may be of any desired construction and may be held in position in any suitable manner as by means of the screw threads 46 and the lock nut 47. The wheel 31 may be similarly secured to the hub 27. The driving member has its inner end internally threaded as at 48 and in engagement with the corresponding external threads on an axially movable sleeve 49. The sleeve 49 is provided with a conical flange 50 which is adapted to coöperate with the conical inner surface of the rib 51 on the hub 27 to form a driving connection between the sleeve 49 and the hub. The inner side of the flange 50 is provided with a recess 52 having a conical surface 53 adapted to engage the conical end of a sleeve 54 which surrounds the axle 10. An extension 55 on the sleeve 49 projects into a recess 56 in the end of the sleeve 54 and a slip ring 57 having one end connected with the extension 55 is arranged between this extension and the surrounding portion of the sleeve 54, whereby the sleeve 49 is frictionally held by the sleeve 54 with sufficient force to permit the driving member 23 to be rotated on the sleeve 49 when the flange 50 is out of engagement with the rib and the end of the sleeve 54.

The sleeve 54 extends through the hub and has its opposite end bearing against the ring 21. Pins 58 are secured in the member 15 and project radially into slots 59 in the end of the sleeve 54 and thereby hold the sleeve against rotation but permitting it to be moved longitudinally on the axle 10.

The operation of the brake is as follows: The sprocket 32 is preferably driven by the engine and the wheel 45 is driven by means of the usual pedals which are provided on a motor cycle. By referring to Fig. 1 it will be seen that when the wheel 45 is rotated in one direction the sleeve 49 will be drawn into engagement with the rib 51 and form a driving connection between the member 23 and the hub so that the rider may propel the vehicle by means of the pedals. When the engine drives sprocket 32 the sleeve 49 is automatically shifted to a position where the flange 50 is out of engagement with the rib 51. The wheel 45 may then remain stationary. When it is desired to use the brake, the wheel 45 is rotated in the opposite direction from that first mentioned (by back pedaling) and this will move the sleeve 49 toward the left, as seen in Fig. 1, into engagement with the sleeve 54 and move this sleeve against the ring 21. Further movement of the sleeve 49 will move the ring 21 and the member 18 which is engaged by the arms 20 on the ring 21 so as to clamp the friction disks 36 and 38 between the ring 42 and the end plate 34. Since the disks 36 rotate with the hub and the disks 38 are held against rotation it will be seen that by clamping these disks together they will act as a brake to retard the wheel.

By arranging the disks 36 and 38 in the chamber between the end plate 34 and the wheel 31 it will be seen that the disks are thoroughly protected from dirt, and this chamber will also serve as a convenient receptacle for lubricant to lubricate the disks so as to prevent excessive wear thereon.

Having thus described my invention what I claim is:

1. In a coaster brake, the combination of a stationary member, a hub, a driving member for the hub, a bearing for one end of the hub carried by said stationary member, a bearing for the other end of the hub carried by said driving member, a friction disk carried by said hub exteriorly of said bearings, a non-rotatable friction disk, a member adapted to be moved axially and rotated by said driving member, and axially movable non-rotatable means actuated by said last-mentioned member for moving one of said friction disks into gripping engagement with the other.

2. In a coaster brake, the combination of a stationary axle member, a driving member rotatably mounted on said axle member, a hub, a bearing on said axle member for one end of the hub, a bearing on said driving member for the other end of said hub, means carried by one end of said hub forming an annular chamber, a non-rotatable member forming a closure at the inner circumference of said chamber, a friction disk carried by said means, a second friction disk arranged along side of said first mentioned disk and carried by said non-rotatable member, and means extending through the interior of said hub for moving said non-rotatable member axially to move one of said friction disks against the other.

3. In a coaster brake, the combination of a stationary axle member, a driving member rotatably mounted on said axle member, a hub, a bearing for one end of said hub on said stationary member, a bearing for the other end of said hub on said driving member, a wheel carried by said hub at one end thereof and having an axially extending flange, a plate secured to said flange and forming with said wheel an annular chamber arranged exteriorly of said bearings, a friction disk in said chamber and carried by said wheel, a non-rotatable member, a second friction disk carried by said non-rotatable member and arranged in said chamber, a sleeve surrounding said axle member within the hub and connected with said non-rotatable member, and means actuated by said driving member for moving said sleeve axially to press one of said friction disks against the other.

4. In a coaster brake, the combination of a stationary axle member, a driving member rotatably mounted on said axle member and having a sprocket wheel secured thereto, a member adjustably mounted on said axle member, means for holding said last mentioned member against rotation, a hub, bearings for said hub arranged at the ends thereof, a wheel mounted on said hub and provided with an axially extending flange, a removable plate secured to said flange and forming with said wheel an annular chamber, a plurality of friction disks carried by said wheel within said chamber, a non-rotatable member having an axially extending flange adjacent said chamber, a plurality of friction disks carried by said last mentioned member and alternately arranged with respect to said first mentioned friction disks, and means for moving said non-rotatable member axially to press said friction disks into gripping engagement.

5. In a coaster brake, the combination of a stationary axle member, a driving member rotatably mounted on said axle member and having a sprocket wheel secured thereto, a stationary member mounted on said axle member and provided with radial slots, a hub, bearings for said hub, an axially movable member, a plurality of friction disks carried by said hub, a plurality of friction disks alternately arranged with respect to said first mentioned disks and carried by said axially movable member, a second axially movable member having arms projecting through said slots and engaging said first mentioned axially movable member, and means actuated by said driving member for moving said second axially movable member to press said friction disks into gripping engagement.

6. In a coaster brake, the combination of a stationary axle member, a driving member rotatably mounted on said axle member, a hub, bearings for said hub, a non-rotatable axially movable member, a plurality of friction disks carried by said hub, a plurality of friction disks carried by said non-rotatable member and alternately arranged with respect to said first mentioned disks, a member axially movable on said axle member and having arms engaging said non-rotatable member, and means extending through the interior of said hub and adapted to be moved axially to press said friction disks into gripping engagement.

7. In a coaster brake, the combination of a stationary axle member, a driving member rotatably mounted on said axle member, a hub having a bearing at one end thereof on said axle member and a bearing at the other end thereof on said driving member, a wheel removably secured to said hub and having an axially extending flange, an end plate secured to said flange and forming with said wheel an annular chamber, an axially movable non-rotatable member mounted on said axle member and having radial projections within said chamber, a plurality of friction disks carried by said wheel within said chamber, a plurality of friction disks carried by said axially movable member within said chamber, and means extending through the hub and adapted to be actuated by said driving member to press said friction disks into gripping engagement.

In testimony whereof I affix my signature in presence of two witnesses.

FREDERICK S. ELLETT.

Witnesses:
J. L. FERGUSON,
LEAH M. JOHNSON.

Copies of this patent may be obtained for five cents each, by addressing the "Commissioner of Patents, Washington, D. C."